Feb. 9, 1954  M. J. STURTEVANT ET AL  2,668,316
BUSHING
Filed Aug. 29, 1950  2 Sheets-Sheet 1
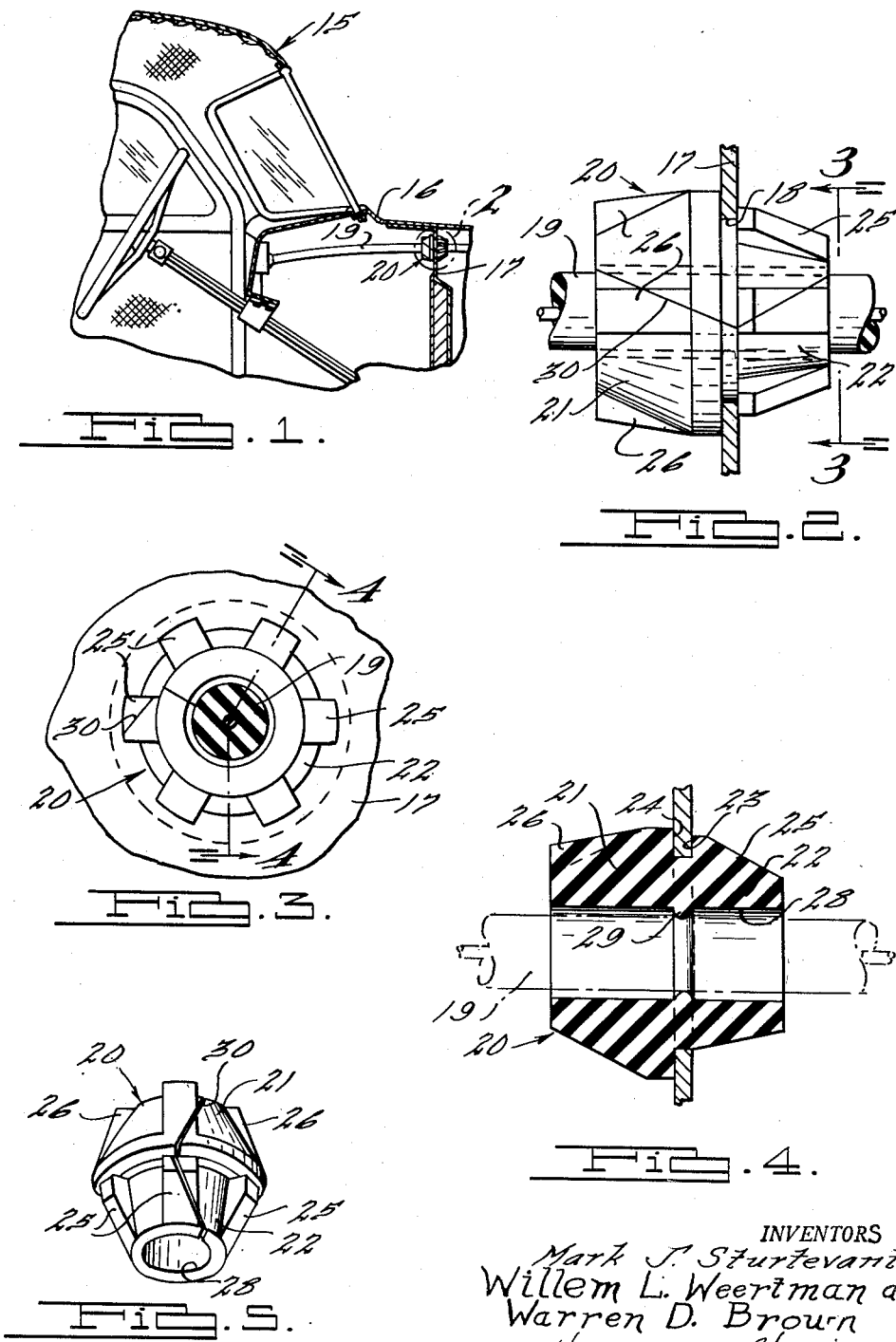
INVENTORS
Mark J. Sturtevant.
Willem L. Weertman and
Warren D. Brown
Harness and Harris
ATTORNEYS
BY.

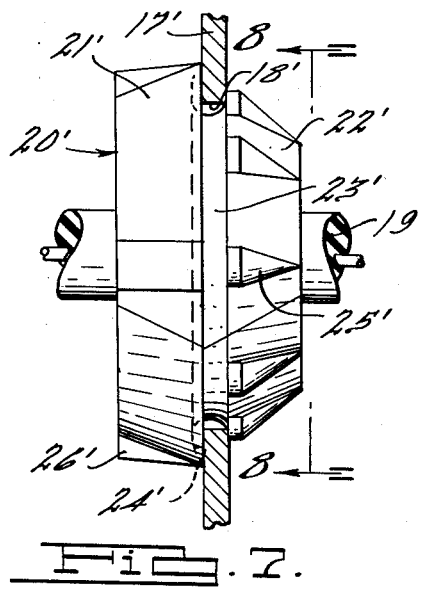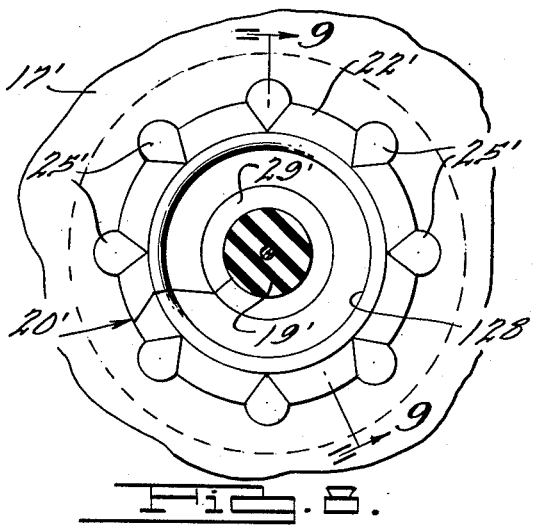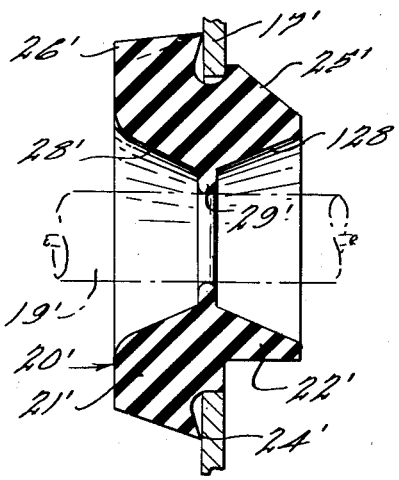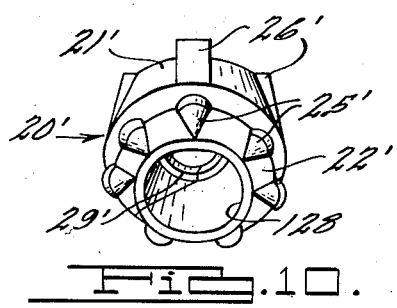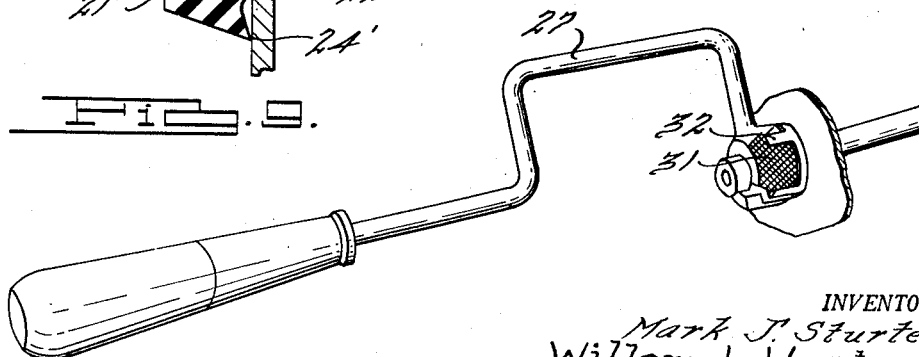

Patented Feb. 9, 1954

2,668,316

UNITED STATES PATENT OFFICE 2,668,316

BUSHING

Mark J. Sturtevant, St. Clair Shores, Willem L. Weertman, Bloomfield Hills, and Warren D. Brown, Detroit, Mich., assignors to Chrysler Corporation, Highland Park, Mich., a corporation of Delaware Application August 29, 1950, Serial No. 182,032

5 Claims. (Cl. 16—2)

This invention relates to a device for supporting wires, rods, cables or like connections against vibration rattle and wear.

As an adaptation of the device, an automobile might be referred to as being one of the many constructions in which the invention may be used. The automobile is provided with electric wires, choke rods, cables, and various other connections which extend through parts of the body, dash, instrument board and other parts of the car. When such connections are extended through these parts, especially when such parts are of thin metal, the connections vibrate causing noise and wear, the latter being very objectionable particularly if the insulation becomes worn and the connections, if electrical, are short circuited.

To overcome this difficulty, a rubber bushing is interposed between the part through which the connection passes and the connection itself thereby serving as an insulator and preventing wear. The present invention has particular reference to improved type of rubber bushing which may be conveniently and speedily applied to a panel through which a connector or other device passes. More particularly, the present invention relates to a rubber-like bushing having means on one end for facilitating a bite with a bushing applying tool which is utilized to apply the bushing to the panel. The subject bushing is also provided with means shown as a resilient web which grips the connection within the bushing. By this construction the opening through which the connection passes is sealed preventing the admittance of moisture, air and foreign matter.

The present bushing is also easily as well as economically manufactured.

The construction of the device will be better understood from the accompanying drawings in which:

Fig. 1 is a side elevational view partially in section of a portion of a motor vehicle body illustrating the application of a bushing embodying the invention.

Fig. 2 is an enlarged side elevational view of the structure shown within the circle 2 of Fig. 1.

Fig. 3 is an end elevational view taken on the line 3—3 of Fig. 2.

Fig. 4 is a sectional view taken on the line 4—4 of Fig. 3.

Fig. 5 is a perspective view of the improved bushing shown in Figs. 1 to 4.

Fig. 6 is a perspective view of the bushing applying tool and its application to the bushing and panel shown in Figs. 1 to 5.

Fig. 7 is a side elevational view similar to Fig. 2 showing a modification of our invention.

Fig. 8 is an end elevational view taken on the line 8—8 of Fig. 7.

Fig. 9 is a sectional view taken on the line 9—9 of Fig. 8.

Fig. 10 is a perspective view of the bushing shown in Figs. 7 to 9.

In Fig. 1 we have shown partially in cross section a motor vehicle, generally designated by the numeral 15, which includes a vehicle body 16 having a compartment wall or panel 17 disposed between the engine and passenger compartments of the vehicle. The compartment wall 17 is provided with an opening 18 which is utilized to permit the passage of a substantially flexible connector or, as shown in the drawings, an ignition cable 19. The opening 18 is lined with a rubber-like bushing, generally designated by the numeral 20, which protects the cable from contact with the panel as well as preventing any rattling and noise at that juncture. The bushing 20 comprises first and second portions 21 and 22 which cooperate to form an annular groove 23. The groove 23 is bounded on one side by a shoulder 24 formed by the portion 21 and on its other side by the front raised portions of a plurality of raised ribs 25. The ribs 25 slope inwardly towards the front end of the bushing 20 to impart a generally frusto-conical contour to the external bounding surface portion 22. This frusto-conical contour is utilized to facilitate the application of the bushing 20 to the opening 18 when the bushing is applied to the panel. The portion 21 of the bushing is generally frusto-conical and is provided with a plurality of raised ribs 26 which are utilized to facilitate a bite with a bushing applying tool 27 shown in Fig. 6.

The bushing 21 is tubular in configuration and is provided with an axially disposed opening or passage 28 through which the cable 19 extends. The bushing is provided with a bead 29 which is disposed within the opening 28 and which engages the cable 19 to effect a substantial seal between the engine and passenger compartments of the vehicle.

To apply our improved bushing to the panel 17, the bushing is provided with a V type split 30 which extends from the exterior of the bushing to the passage 28. The bushing is first pulled open in the V split 30 and placed around the cable 19 and thereafter, the tool 27, which is provided with a head 31 having rib receiving slots 32, engages the portion 21 so that the ribs 26 thereon are received by the grooves 32 to effect a bite between the bushing and the tool. The tool 27 is rotated and the portion 22 of the bushing, which has a frusto-conical contour, is effectively moved into the position wherein the groove 23 in the bushing receives the edge portions surrounding the opening 18 in the panel 17. Rotation of the bushing by the tool 27 and rightward pressure of the bushing, as viewed in Fig. 6, is employed in order to insert the end portion 22 of the bushing through the opening 18 until the shoulder 24 abuts the side of the panel 17 in which the hole 18 is formed. When this position is reached, the outermost portions of the ribs 25 expand outwardly and abut the opposite side of the panel 17. The spaces between the ribs 25 accommodate lateral expansion of the material of the ribs as the end portion 22 of the bushing is inserted in the hole 18 and the rotation of the bushing during this operation causes the inserting action to simulate a threading operation and thus guards against injury to the end portion 22 of the bushing. The V-shaped split 30 that extends longitudinally of the bushing 20 provides matingly engaged tongue and groove portions on opposite sides of the split 30 that resist any relative longitudinal movement of the split separated portions of the bushing element during the pressure applied insertion of the bushing 20 in its receiving panel opening 18.

In Figs. 7, 8, 9 and 10, we have shown a modification of our invention. A bushing, generally designated by the numeral 20', comprising first and second portions 21' and 22' defining a groove 23' therebetween, is disposed within an opening 18' and a panel 17'. The portion 22' of the bushing is provided with a plurality of raised ribs 25' which engage one side of the edge portions of the panel 17' surrounding the opening 18' while the portion 21' is provided with a shoulder 24' which engages the other side of the edge portions of the panel 17' surrounding the opening 18'. The shoulder 24' is slightly dished so that the very tip of the shoulder 24' extends forwardly of the portion 21' to produce a relatively high unit pressure seal with the panel 17' when the bushing is in place. This construction will be noted more clearly in Fig. 9. The portion 21' is provided with a plurality of ribs 26' which are utilized to form a bite with a bushing applying tool in a similar manner as illustrated relative to the form in Fig. 6. The bushing 29' is substantially different from the bushing 20 in that it is provided with a pair of converging frusto-conical axially aligned openings 28' and 128. These surfaces converge to form a bead 29' substantially centrally of the bushing. It will be seen that the bead 29' engages the cable 19' passing therethrough and due to the frusto-conical shapes of the openings 28' and 128, the cable 19' is afforded angular movement when it is disposed within the bushing. This particular form of our invention is advantageous where constructions utilizing movable cables are employed.

Although we have shown our improved invention as applied to an automobile, it should be realized that such is for the purpose of illustration only; and that our improved bushing may be used advantageously in numerous constructions. It should also be noted that while the drawings show only one cable passing through our improved bushings, the inner portions of the bushings may be modified to accommodate more than one cable without departing from the spirit of the invention.

We claim:

1. A bushing formed of readily yieldable material comprising a substantially tubular element having first and second opposed end portions that are shaped to provide an annular groove extending transversely about the outer surface of the tubular element at a location intermediate said end portions, one of said end portions having the outer surface thereof formed to present a tapering external configuration that extends longitudinally of the tubular element and diverges from the exposed end of said one end portion towards said other end portion, said tubular element having a split therethrough that extends lengthwise of the element between the exposed ends thereof, said split in side elevation being of V-shaped configuration to provide tongue and groove engaged means resisting relative movement longitudinally of said element of the portions of the tubular element on opposite sides of said split.

2. A bushing formed of readily yieldable material comprising a substantially tubular element having first and second opposed end portions that are shaped to provide an annular groove extending transversely about the outer surface of the tubular element at a location intermediate said end portions, one of said end portions having the outer surface thereof formed to present a tapering external configuration that extends longitudinally of the tubular element and diverges from the exposed end of said one end portion towards said other end portion, said tubular element having a split therethrough that extends lengthwise of the element between the exposed ends thereof, said split in side elevation being of V-shaped configuration to provide matingly engaged means resisting relative movement longitudinally of said element of the portions of the tubular element on opposite sides of said split, and an annular bead projecting radially inwardly from the inner surface of the tubular element providing means to sealingly engage the exterior surface of the article that is adapted to be mounted within the bore of the tubular bushing element.

3. A bushing formed of readily yieldable material comprising a substantially tubular element having first and second opposed end portions, one of said end portions having the outer surface thereof formed to present a tapering external configuration that extends longitudinally of the tubular element and diverges from the exposed end of said one end portion towards said other end portion, said tubular element having a split therethrough that extends lengthwise of the element between the exposed ends thereof, said split in side elevation being of V-shaped configuration to provide matingly engaged means resisting relative movement longitudinally of said element of the portions of the tubular element on opposite sides of said split.

4. A bushing formed of readily yieldable material adapted to line an opening in a panel or the like and to space an article extending through said opening from said panel comprising a substantially tubular element having first and second opposed end portions that are shaped to provide an annular groove extending transversely about the outer surface of the tubular element at a location intermediate said end portions, one of said end portions having the outer surface thereof formed of a plurality of longitudinally extending, tapered ribs so as to present a tapering external configuration to said one end portion that extends longitudinally of the tubular element and diverges from the exposed end of said one end portion towards said other end portion, said tubular element having a split therethrough that extends lengthwise of the element between the exposed ends thereof, said split in side elevation being of V-shaped configuration to provide matingly engaged means resisting relative movement longitudinally of said element of the portions of the tubular element on opposite sides of said split, and an annular bead projecting radially inwardly from the inner surface of the tubular element providing means to sealingly engage the exterior surface of the article mounted within the tubular bushing element.

5. A bushing formed of readily yieldable material adapted to line an opening in a panel or the like and to space an article extending through said opening from said panel comprising a substantially tubular element having first and second opposed end portions that are shaped to provide an annular groove extending transversely about the outer surface of the tubular element at a location intermediate said end portions, one of said end portions having the outer surface thereof formed of a plurality of longitudinally extending, tapered ribs so as to present a tapering external configuration to said one end portion that extends longitudinally of the tubular element and diverges from the exposed end of said one end portion towards said other end portion, said tubular element having a split therethrough that extends lengthwise of the element between the exposed ends thereof, said split in side elevation being of V-shaped configuration to provide matingly engaged means resisting relative movement longitudinally of said element of the portions of the tubular element on opposite sides of said split, and an annular bead projecting radially inwardly from the inner surface of the tubular element providing means to sealingly engage the exterior surface of the article mounted within the tubular bushing element, the bore in said tubular element being shaped to provide said first and second end portions with axially aligned openings each of generally frusto-conical configuration and each of which has its longer diameter adjacent the exposed end of the associated end portion and its smaller diameter adjacent said annular bead.

MARK J. STURTEVANT.
WILLEM L. WEERTMAN.
WARREN D. BROWN.

References Cited in the file of this patent

UNITED STATES PATENTS

| Number | Name | Date |
|---|---|---|
| 141,473 | Thompson | Aug. 5, 1873 |
| 2,104,217 | Barnes | Jan. 4, 1938 |
| 2,225,472 | Franklin | Dec. 17, 1940 |
| 2,291,430 | Ingersoll | July 28, 1942 |
| 2,454,707 | Meyers et al. | Nov. 23, 1948 |